March 21, 1967 G. L. KELLEY ETAL 3,309,791
ARTIFICIAL INSEMINATION TEACHING APPARATUS
Filed March 5, 1965 3 Sheets-Sheet 1
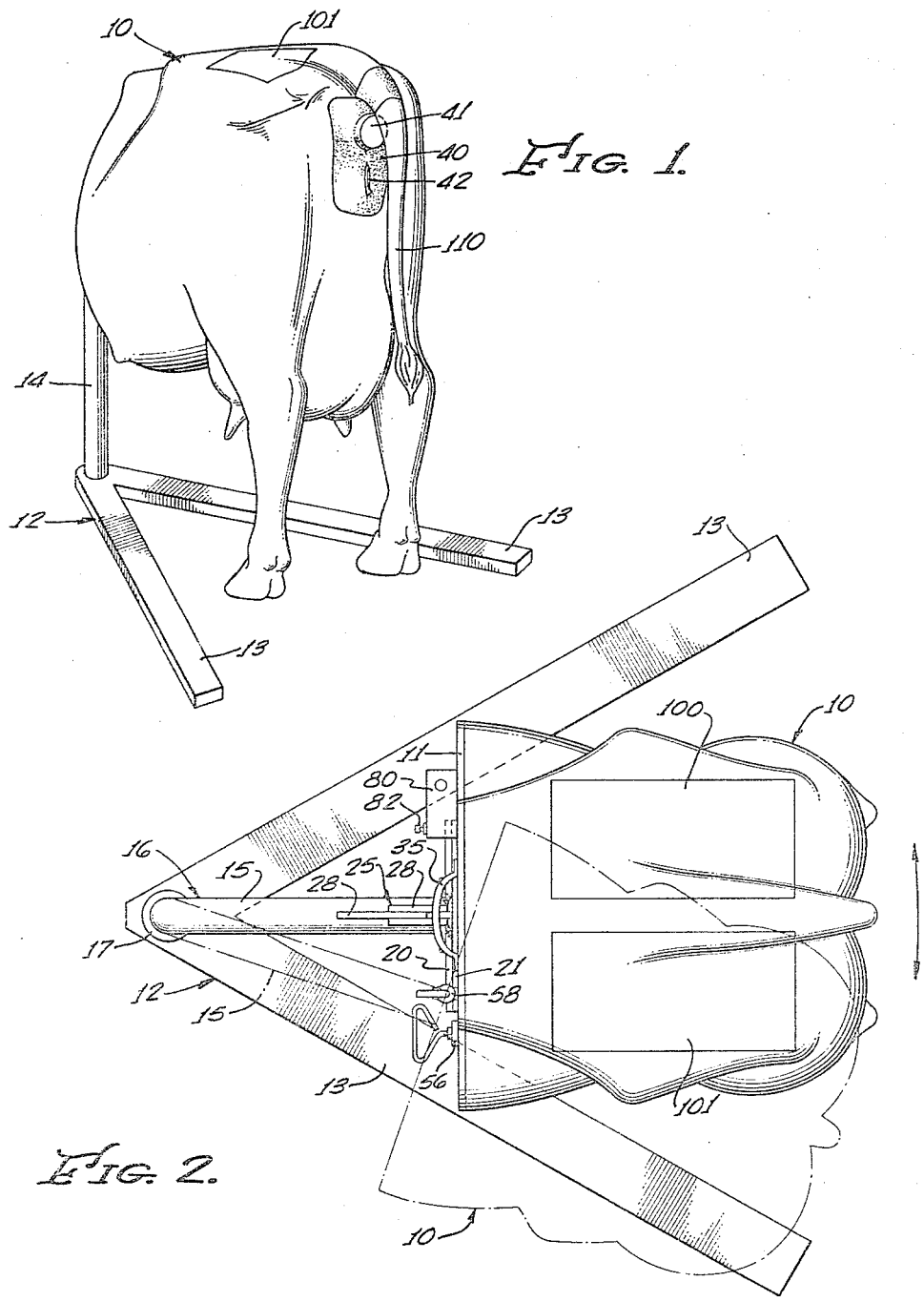
INVENTORS.
GERALD L. KELLEY
ROY U. SELOVER, JR.
BY FOWLER, KNOBBE
& GAMBRELL
ATTORNEYS.

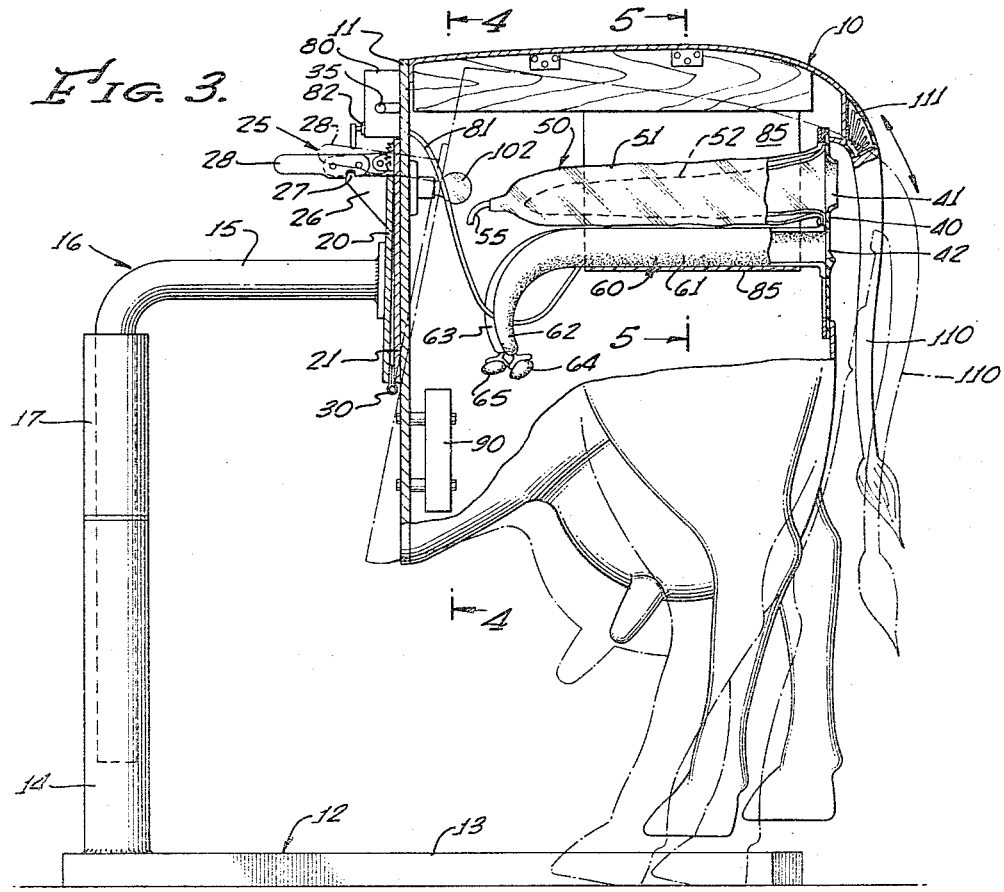
Fig. 3.
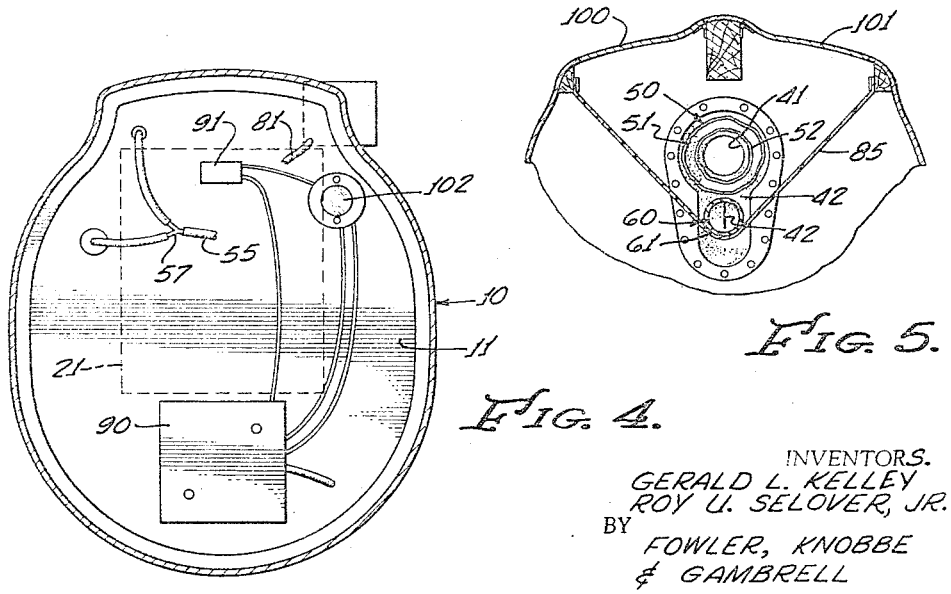
Fig. 4.
Fig. 5.
INVENTORS.
GERALD L. KELLEY
ROY U. SELOVER, JR.
BY FOWLER, KNOBBE & GAMBRELL
ATTORNEYS.

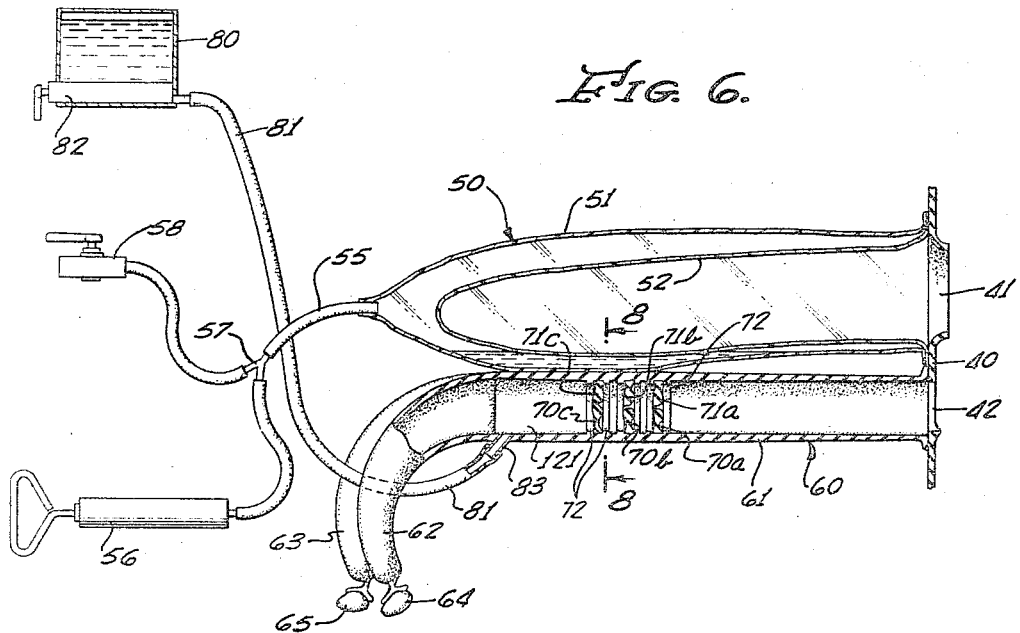
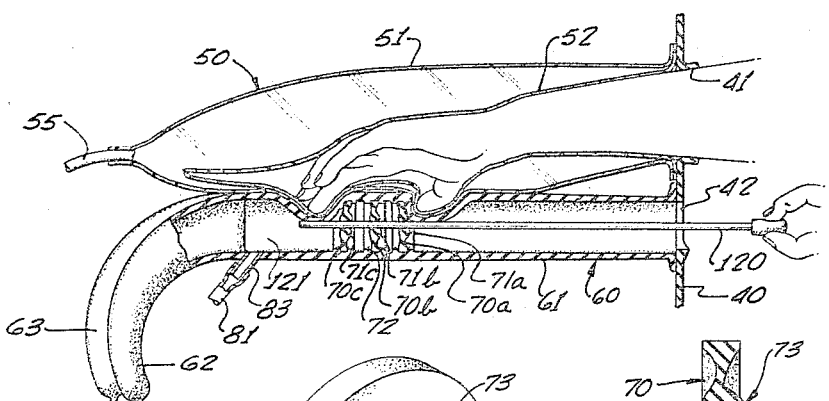
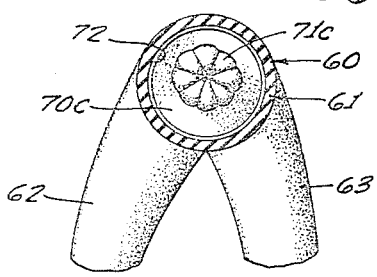
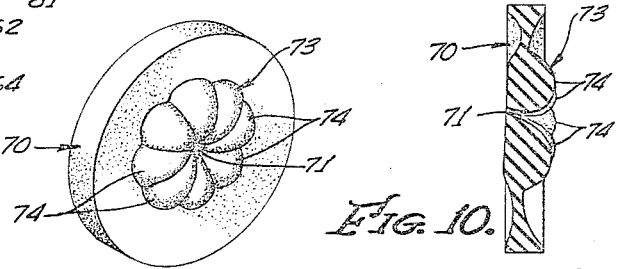
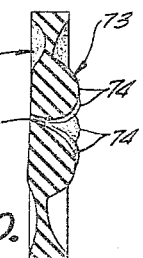

United States Patent Office 3,309,791
Patented Mar. 21, 1967

3,309,791
ARTIFICIAL INSEMINATION TEACHING
APPARATUS
Gerald L. Kelley, Sonora, and Roy U. Selover, Jr., Modesto, Calif., assignors to Kelver Company, a corporation of California
Filed Mar. 5, 1965, Ser. No. 437,354
32 Claims. (Cl. 35—1)

Our invention relates to a teaching apparatus for facilitating instruction in the technique of artificial insemination. The invention is particularly suited for teaching the deep uterine insemination of bovine and Equidae animals.

In natural mating, the bull deposits billions of sperm cells into the vagina. By the time the sperm has passed through the cervix, the numbers have been reduced to millions instead of billions. In contrast, in the deep uterine insemination technique, the insemination tube is first passed through the vagina and cervix and the semen then deposited near the base of the horns of the uterus. The substantially higher proportion of successful inseminations thus attained has resulted in the universal adoption of the deep uterine method.

Artificial insemination techniques have been used for improving herds of dairy cattle for a number of years, the first organized artificial breeding association being formed in the United States in 1937. More recently, artificial insemination has been used for beef cattle, the first recorded successful artificial insemination of beef cattle occurring in approximately 1950. Since then, the use of artificial insemination has been increasingly expanded because of the important advantages it offers the cattle grower. One advantage is that the cattleman may build a very uniform herd of outstanding cattle. Another advantage is that the calves from progeny proven bulls gain at a faster rate so that they are substantially heavier than average at weaning weight.

Artificial insemination also permits the cattleman to substantially reduce the number of bulls required for a given number of cows. Besides the obvious advantage that fewer bulls mean fewer problems for the cattleman, a reduction of the bull inventory decreases his out-of-pocket expenses, since one bull eats enough feed to produce one and one-half calves. Still another advantage of employing artificial insemination is that the use of a good bull can be extended somewhat fantastically. Thus, even the most desirable bull, while able to naturally sire only 30 to 50 calves per year, may, through the use of artificial insemination, sire 10,000 calves per year.

One of the primary factors which is holding back the expansion of artificial insemination into such areas as the breeding of beef cattle is the shortage of trained personnel for performing artificial insemination. The technician must develop a particular technique to properly perform the insemination, which technique requires actual experience practicing the insemination procedure. Thus, the procedure of insemination of bovine and Equidae animals includes the steps of: gripping with the right hand the animal's tail near the tail head; pointing the fingers of the left hand; inserting the left hand into the animal's rectum; rotating the left hand downwardly and backward to open the animal's vulva; inserting the inseminating tube into the animal's vagina with the tube directly upwardly against the left hand; and locating the cervix with the left hand through the wall of the rectum and using the left hand to work the cervix gradually back over the tube while applying only very slight pressure to the tube until the tube passes through the cervix and into the uterus.

Heretofore, the tools available for instructing the technique of artificial insemination were live cattle and organs removed from freshly killed cattle. The organs themselves are not always available, are highly perishable, and only very poorly duplicate the live animal since they are absolutely inert when used by the student. Live cattle are expensive to purchase and maintain; therefore, a school for teaching proper artificial insemination techniques must be located where the cows can be maintained. However, the students are usually quite inept at first so that the cows cannot be used for more than a few days without causing permanent damage to their organs. Cases are not uncommon in which cattle have died because of their having been inadvertently abused by the students. The instructor of artifical insemination is, therefore, faced not only with the expense of providing the cattle but also has a grave difficulty in providing humane treatment for the animals.

It is an object of our invention to provide an apparatus for facilitating the instruction of deep uterine insemination in which each and every one of the steps of an actual insemination can be duplicated in a most lifelike manner.

It is another object of the present invention to provide a teaching apparatus for artificial insemination which is portable and which can be used in any classroom or like facility.

A further object of this invention is to provide an apparatus on which the student may acquire sufficient skill in the technique of artificial insemination so that the student is sufficiently adept to practice on a live animal without causing harm thereto. The correlative advantage is that very few cows will suffice for a large class of students with minimum danger that the animals will be harmed or improperly handled.

Other objects of this invention will be apparent as the description proceeds.

Briefly, in accordance with a preferred embodiment of our invention, a teaching apparatus for use in instructing in the use of artificial insemination comprises a housing having an external configuration simulating the posterior portion of the type of animal for which instruction is being given. The housing includes a flexible wall section having upper and lower openings respectively communicating with an elongated cavity having flexible, inflatable walls and an elongated cylindrical member, both of which are located within the housing member. The elongated cylindrical member includes a plurality of spaced members having non-aligned openings. The cavity member is large enough for the student's hand and forearm to enter, corresponding in size to the animal's rectum. The elongated cylindrical member is somewhat smaller, corresponding in size to the animal's vagina.

Advantageously, the teaching apparatus includes an electrical heater located within the housing for raising the temperature of the interior of the housing so that it approximates that of the live animal. Additionally, a fluid reservoir and valve is preferably incorporated for selectively injecting a fluid into the elongated cylinder at a point remote from the flexible wall section.

In use, the student practices on the test apparatus in a manner identical to that employed with the live animal. Teaching apparatus constructed in accordance with our invention sufficiently simulates the feel, shape and appearance of the live animal so that the student can obtain substantial proficiency in the art and science of artificial insemination and its allied fields before performing the insemination of live animals.

A more thorough understanding of the invention may be obtained by a study of the following detailed description taken in connection with the accompanying drawings in which:

FIG. 1 is a perspective view of the exterior of a preferred embodiment of the present invention;

FIG. 2 is a plan view of the apparatus shown in FIG. 1, showing the freedom of movement of the teaching apparatus about a vertical axis;

FIG. 3 is an elevation view, partially in cross-section, illustrating the freedom of movement of the teaching apparatus about a horizontal axis;

FIG. 4 is a sectional view taken along line 4—4 of FIG. 3, illustrating the components mounted on one internal wall of the housing;

FIG. 5 is a sectional view taken along line 5—5 of FIG. 3, particularly showing the cavity forming member and cylindrical member in section and their supporting means within the housing;

FIG. 6 is an enlarged view of the cavity forming member and the elongated cylindrical member partly in section, particularly showing the means for inflating the walls of the cavity and means for injecting fluid into the elongated cylinder;

FIG. 7 is an elevation view of the cavity forming member and elongated cylindrical member, partly in section, showing the manner in which the student practices upon the apparatus to gain proficiency in the art of artificial insemination; and FIG. 8 is a sectional view taken along line 8—8 of FIG. 6 and particularly shows one of the plural apertured means within the elongated cylindrical member; and FIG. 9 is an enlarged perspective view of the disc mounted within the cylindrical member; and FIG. 10 is a cross-sectional view of the disc shown in FIG. 9.

Referring now to the drawings, and particularly to FIGS. 1, 2 and 3, the teaching apparatus comprising a rigid housing 10 having an exterior configuration simulating the posterior of the animal for which instruction is being given, a bovine animal being illustrated. This housing is advantageously formed of fiber glass. Housing 10 includes a vertical planar wall 11 supported by a floor-mounted stand 12 comprising a V-shaped base 13 and a hollow cylindrical pedestal 14 welded to the base 13 and vertically extending therefrom. A cylindrical support member 15 having an outside diameter slightly smaller than the inside diameter of pedestal 14 is formed with a right-angle bend as shown at 16 and fitted with an elongated collar 17 attached to the upper edge of pedestal 14. In this manner, the member 15 is free to swivel within the pedestal as illustrated by the positions shown in FIG. 2.

The other end of member 15 is rigidly attached to a mounting plate 20 hinged at its lower end to a somewhat larger mounting plate 21 rigidly affixed to the end 11 of housing 10. Plate 20 is adapted to be retained parallel to plate 21 by a spring-loaded latch assembly 25 comprising a latch plate 26 having an integral shoulder 27 and a spring-loaded detent 28 adapted to engage the shoulder 27. The detent is connected to a release handle 28 pivotally mounted to the plate 21. Upward movement of the release handle 28 causes the detent to disengage from the shoulder 27, allowing the plate 21 to pivot with respect to the hinge axis 30. In this manner, the housing 10 may be pivoted about a horizontal axis through the hinge axis 30 and about the vertical axis of pedestal 14. A handle 35 is affixed to wall 11 to facilitate movement of the housing 10.

The rigid housing 10 includes an opening formed in the anal and vulvular areas of the simulated animal, which opening is covered by a relatively thick, resilient wall section 40 having an upper, generally circular opening 41 and a smaller slotted opening 42, respectively simulating the anus and vulva of a live animal. Wall section 40 is preferably formed by preparing a plaster or aluminum mold of the requisite configuration, filling the mold with a solution comprising 30% poly-vinyl resin and 70% plastic-sol and heating the solution in the mold to approximately 375° F. As is well known in the plastic molding art, this liquid mixture undergoes a chemical change at elevated temperatures and assumes a rubber-like composition of substantial elasticity.

Internally mounted within the housing 10 and in communication with the openings 41, 42 are members 50 and 60 simulating the feel, shape and appearance of the animal's rectum and reproductive organs, respectively.

Member 50 forms an elongated cavity having an outer wall 51 and an inner wall 52 joined together at one end to the flexible wall 40 so that an interior cavity 53 is formed by the inner wall 52 in communication with the opening 41. The walls 51, 52 are advantageously formed from thin sheets of flexible vinyl plastic of the order of .030 inch thick. As shown in FIG. 6, a portion of the space between the inner wall 52 and outer wall 51 is preferably filled with a viscous fluid which may be water and the remainder of the space adapted to be inflated by an air hose 55 attached to an air pump 56 via Y connection 57. The viscous fluid aids in simulating the actual lubrication encountered in the rectal area of a live animal. The air within the inflatable cavity wall may be selectively released by opening valve 58 attached to the other leg of the Y connection 57. The thin cavity walls simulate both the feel and shape of an animal's rectal section, and, further, the outer wall 51 simulates the thin membrane laterally separating the rectum and reproductive organs of a live animal.

Member 60 comprises an elongated cylindrical-O-shaped section 61 connected to the flexible wall 40 in communication with the slotted opening 42. As shown in FIGS. 6 and 7, member 60 is preferably formed with a thin wall thickness near the opening 42, becoming thicker toward the back and terminating in a pair of downwardly curved, horn-shaped members 62, 63 and small appendages 64, 65 to simulate the appearance of the horns of the uterus and the ovaries of the animal's reproductive tract.

As shown in detail in FIGS. 6-8, the cylindrical member 60 includes spaced discs 70a, 70b and 70c having respective apertures 71a, 71b and 71c simulating the animal's cervix. The discs 70 are cemented within the cylinder 61 between spaced rings 72 formed on the interior wall thereof which maintain the discs in the proper position while the member 60 is manipulated during the instruction and practice by the student as described below. The discs 70 are molded to the configuration shown in FIGS. 9 and 10, and include an inner member 73 on one side of the disc having an overall circular shape and comprising a cluster of radially oriented bulbar masses 74 with a skewed aperture 71 through the center thereof. As shown in FIG. 6, the discs are located within the cylinder 61 with the members 73 facing toward opening 42 and arranged so that the skewed apertures 71a, 71b and 71c are out of alignment with one another. This construction requires the student to manually manipulate the rings 72 and apertures 71 over the insemination tube in a manner quite similar to the technique used for inseminating live animals.

Member 60 and the spaced discs 71 are preferably formed by molding a poly-vinyl plastic-sol mixture as described hereinbefore. A desirable mixture is 20% poly-vinyl resin and 80% plastic-sol to provide more elasticity in these members than in the wall section 40. This poly-vinyl plastic-sol material enables a very resilient, natural feeling member to be constructed while having a texture and thickness such that the material self maintains its circular cross-sectional configuration. The cylindrical portion 60 is advantageously formed by dipping a heated mandrel into the liquid mixture and baking the solution which remains on the rod. This operation is repeated until a wall thickness of the requisite thickness is built up. Also, the thickness of the wall is easily graduated to form the configuration shown by selectively dipping a portion of the rod more times than the entire length of the rod. When the cylinder is completed, it has sufficient elasticity to be slipped off of the mandrel.

Means are provided for injecting a simulated mucous discharge within the cylindrical member 61 at a point remote from the flexible wall 40. As shown in FIG. 6, a reservoir 80 is attached to the exterior wall 11 and connected via a fluid conduit 81 and valve 82 to an inlet port 83 located in member 61. A gelatinous solution is retained in the reservoir 80 and gravity fed to port 83 to simulate the discharge of a live animal.

Members 50 and 60 are sized to correspond with the elimination and reproductive organs, respectively of the animal being simulated. In all cases, the cavity formed by member 50 will be large enough to admit the student's hand and forearm in order to admit teaching of the deep uterine insemination technique. The apparatus illustrated in the figures is scaled to simulate the organs of a live cow. However, by way of specific example, it will be apparent that smaller organs can be used to simulate yearling heifers, thereby enabling a student to become proficient in inseminating heifers.

We have found that the members 50 and 60 when constructed in the manner described above, sufficiently approximate the feel, shape and appearance of the animal's waste tract and reproductive organs so that the student can directly utilize the techniques which he learns on the apparatus for inseminating live animals.

The cavity forming member 50 and cylindrical member 60 are maintained in relatively horizontal configuration, member 50 above member 60, by a flexible sheet 85 attached within the housing 10 to opposite corners of the housing as shown in FIG. 5. A sheet of flexible vinyl plastic of the order of .040 inch thick provides the necessary support of member 50, 60 and accurately reproduces the feel of the broad ligament of the animal.

The interior of housing 10 is adapted to be heated to the temperature corresponding to the live animal by an electrical heating element 90. Advantageously, the electrical power delivered to the heater 90 is regulated by an electrical thermostat sensor and control switch 91 located within the housing and electrically connected in series with the heater 90.

The interior of the housing 10 is preferably provided with a pair of observation doors 100, 101 located in the upper surface of the housing 10 so that the instructor and other students may observe a student as he learns or practices the artificial insemination technique. An electrical lamp 102 located within the housing (FIGS. 3 and 4) facilitates viewing the apparatus located within the interior of body 10.

The body 10 includes a flexible member 110 extending downwardly over the openings 41, 42 and attached by a heavy coil spring 111 just above the flexible wall 40 for simulating the tail of the live animal. This member simulates both the appearance and action of the animal for aiding the teaching of the insemination process. Thus, the spring 111 is selected to provide a fairly strong bias force on the depending tail 110 so that it constantly bears against the student's arms during the training on the teaching apparatus and thus simulates tail movement of the live animal against the technician's arms during an actual artificial insemination.

A course of instruction in the technique of artificial insemination utilizing our invention involves having the student practice the identical steps on the teaching apparatus as the heretofore enumerated steps which are performed on the live animal during an actual insemination. Thus, the student initially soaps his left hand and forearm with a soapy water solution and inserts it through the upper circular opening 41 into the interior of the double-walled member 50 until he locates by feel the plural discs 70a, 70b, 70c within the cylindrical member 61. At the same time, the insemination tube 120 is guided by the right hand through the slotted opening 42 of the flexible wall 40 and into the interior of the cylindrical member 61. The student then endeavors to pass the tube 120 through the individual apertures 71a, b and c of the discs 70a, b and c into the interior portion 121 of the member 60. This is achieved by properly manipulating the member 60 and its associated disc structure with his left hand as shown in FIG. 7. It will be seen that the non-alignment of the apertures 71a, b and c in conjunction with their being sized approximately equal or even slightly smaller than the outer diameter of the insemination rod 120 will necessitate that the student develop considerable manipulative dexterity in order to pass the inseminating tube 120 completely through into the interior 121 of the member 60 and thus duplicate a deep uterine insemination.

While the student endeavors to perform this operation, the instructor stands back of the wall 11 of the housing 10 and grasps the control handle 35 in one hand and selectively pumps air into or releases air out of the double-walled cavity 50. The entrance of air into the member 50 separates the bottom of the interior wall 52 from the top of the exterior wall 51 and places an air sac between the student's hand and member 60, thereby making it quite difficult for the student to feel the discs 70 and pass the tube 120 through the apertures 71.

During the instruction period, the instructor also pivots the housing 10 by means of the handle 35. The pedestal 14 and hinged mounting plates 20, 21 support the housing for pivotal movement about a vertical axis located forward of the flexible wall 40 and upon a horizontal axis parallel to and forward of the flexible wall 40 so that the instructor may simulate typical side-to-side and up-and-down movements of a live animal during the insemination procedure.

The instructor also opens and closes the valve 82 to admit fluid into the cylindrical member 61 so that while the student manipulates the member 60 with his left hand, the mucous simulating fluid will be forced from the interior 121 of the member 60 through the aperture 71 into the frontal portion of the cylindrical member 61 in a like manner.

We have found that by appropriate movement of the body 10 and introduction of air into the hollow walls of the cavity member 50, the instructor can create conditions that are at least as arduous as those present when working with live animals so that the student develops substantial skill with the teaching apparatus. As a result, the insemination of the live animal may seem even easier to the student than performing a simulated insemination with the teaching apparatus. In this way, the student obtains a sufficient degree of proficiency working with the teaching apparatus so that he is enabled to properly artificially inseminate a live animal the first time that he performs the operation.

Accordingly, our invention not only substantially reduces the expense of teaching others in the technique of artificial insemination, but also offers an ethical means for doing so since the instructor can closely observe the proficiency of a student prior to allowing him to perform the insemination on a live animal. In this way, the improper handling of the cows by the students can be almost entirely eliminated.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim:
1. A teaching apparatus for instructing the technique of artificial insemination of bovine animals and the like comprising
    a housing having an external configuration simulating the posterior portion of an animal, said housing having an opening at the anal and vulvular area of said animal,
    means for supporting said housing for pivotal movement about a vertical axis located forward of said housing opening and upon a horizontal axis parallel to and forward of said housing opening,
    a sheet of thick pliant material covering the opening of said housing in the anal and vulvular area and having first and second vertically spaced openings therein, a thin membrane forming an enclosed elongated cavity, the open end of which is affixed to said sheet of pliant material and in communication with the upper opening thereof, a generally cylindrical elongated member formed of a resilient material having the texture and thickness such that the material maintains a circular cross-sectional configuration, said member being located within said housing having an open end attached to said pliant covering material in communication with the lower opening thereof, said cylindrical member having a plurality of generally disc-shaped members having non-aligned openings located therewithin, a length of flexible material supported at its respective ends to opposite sides of the interior walls of said housing and supporting said cavity and cylindrical members in a generally horizontal configuration within said housing, an electrical heater located within said housing for heating the interior thereof to a temperature above ambient, and a flexible member attached to the exterior of said housing just above the anal and vulvular area and spring-loaded to substantially cover the openings therewithin.

2. A teaching apparatus for use in instructing in the technique of artificial insemination of bovine animals and the like comprising housing means having an external configuration simulating the posterior portion of an animal, said means including a flexible wall section having respective upper and lower openings, means for providing an elongated cavity having flexible and inflatable walls, said means being located within said housing with said cavity in communication with said upper opening of said flexible wall section, means forming an elongated cylindrical member in communication with said lower opening of said flexible wall section, said means including a plurality of spaced members having non-aligned openings, means for supporting said cavity and cylindrical means in generally horizontal position within said housing, means for selectively injecting a fluid into said cylindrical means at a point remote from said flexible wall section, and means for heating the interior of said housing.

3. A teaching apparatus for use in instructing in the technique of artificial insemination of bovine animals and the like comprising housing means having a first opening large enough to admit a person's hand and a second opening large enough to admit the inseminating tube, means for providing a cavity located within said housing in communication with the first opening of housing means, said cavity being large enough to admit a person's hand and having at least a portion comprising a thin, flexible wall;

means for providing an elongated enclosed member in communication with the second opening of said housing means, said means forming a centrally located aperture within said elongated enclosed member, said aperture corresponding in diameter to the outer diameter of the insemination tube; and means for supporting the thin, flexible wall of said cavity means adjacent said elongated member in a generally horizontal position within said housing and enabling the manipulation of said elongated means through the intervening flexible cavity wall.

4. The teaching apparatus described in claim 3 comprising:

means for supporting said housing means for pivotal movement about a vertical axis located forward of said first and second housing openings and about a horizontal axis parallel to and forward of said housing openings.

5. The teaching apparatus described in claim 4 wherein said support means comprises:

a base, a hollow cylindrical pedestal rigidly affixed to said base and vertically extending therefrom, and means rotatably mounted in said pedestal for supporting said housing for pivotal movement about said horizontal axis parallel to and forward of said housing opening.

6. The teaching apparatus described in claim 5 wherein said means for supporting said housing for pivotal movement about a horizontal axis comprises:

a generally L-shaped member having one leg vertically extending into said pedestal and free to swivel therewithin and the other leg extending in a horizontal direction and hinged to said housing means.

7. The teaching apparatus described in claim 4 comprising latching means for selectively restricting pivotable movement of said housing about said horizontal axis.

8. The teaching apparatus described in claim 5 wherein said means for supporting said housing for pivotal movement about a horizontal axis comprises a generally L-shaped member having one leg vertically disposed in said pedestal and free to swivel therewithin, and another leg extending horizontally from said pedestal and having a first mounting plate rigidly affixed to the end thereof and supported in a vertical plane;

a second mounting plate hinged at its lower end to said first mounting plate, said second plate being affixed to said housing; and a spring-loaded latch assembly for selectively restricting pivotable movement between said plates.

9. The teaching apparatus described in claim 3 wherein:

said housing means comprises a generally rigid member having an external configuration simulating the posterior portion of an animal and having an opening formed in the anal and vulvular areas of the simulated animal, said opening being covered by a relatively thick, resilient wall section having an upper, generally circular opening and a lower, slotted opening respectively simulating the anus and vulva of the simulated animal.

10. The teaching apparatus described in claim 9 wherein:

said flexible wall section is formed by molding a polyvinyl plastic-sol mixture.

11. The teaching apparatus described in claim 10 wherein said mixture comprises approximately 30% polyvinyl resin and approximately 70% plastic-sol.

12. The teaching apparatus described in claim 3 wherein said cavity means comprises an enclosed outer wall and an enclosed inner wall formed of thin, flexible material and joined together at one end to form an interior cavity in communication with the first opening of said housing means; and means for selectively separating said inner and outer walls where they overlie said elongated means.

13. The teaching apparatus described in claim 12 wherein said means for separating the walls of the cavity means comprises means for filling the space between the outer and inner walls with air.

14. The teaching apparatus described in claim 12 comprising a viscous fluid filling a portion of the space between the inner wall and outer walls of said cavity means.

15. The teaching apparatus described in claim 12 wherein said inner and outer walls are formed of thin sheets of flexible plastic.

16. The teaching apparatus described in claim 3 wherein said means for providing an elongated enclosed member includes:

an elongated cylindrically shaped portion formed of an elastic material having a texture and thickness such that the material self maintains a circular cross-sectional configuration.

17. The teaching apparatus described in claim 16 wherein:

said cylindrical member is formed with a thin-wall thickness near the opening in said housing wall, becoming thicker toward the back and terminating in a pair of downwardly curved horn-shaped members and small appendages to simulate the appearance of the horns of the uterus and the ovaries of the animal's reproductive tract.

18. The teaching apparatus described in claim 3 wherein said means forming a centrally located aperture comprises:

a generally disc shaped member including an inner portion having an overall circular shape and comprising a cluster of radially oriented bulbar masses with a skewed aperture through the center thereof.

19. The teaching apparatus described in claim 16 wherein said cylindrically shaped portion includes:

first and second spaced annular rings located in the interior thereof for locating said aperture forming means and maintaining it in position when said elongated, enclosed member is manipulated.

20. The teaching apparatus described in claim 3 wherein aperture forming means comprises first and second discs having a skewed aperture through the center thereof and being located in spaced relation with one another inside said elongated member with their respective apertures out of alignment with one another so that said elongated enclosed member must be externally manipulated in order to pass the inseminating tube through said apertures.

21. The teaching apparatus described in claim 3 comprising means for selectively injecting a fluid into said elongated enclosed member.

22. The teaching apparatus described in claim 21 wherein said means for injecting a fluid into said elongated enclosed member comprises an inlet port in said elongated enclosed member on the side of said aperture forming means opposite the opening in said housing wall and conduit means for conducting a fluid to said inlet port so that manipulation of said elongated enclosed member forces the fluid from the interior of the elongated means through said aperture into the frontal portion of the elongated enclosed member.

23. The teaching apparatus described in claim 21 wherein said fluid comprises a gelatinous solution.

24. The teaching apparatus described in claim 3 wherein said elongated member is formed of a poly-vinyl plastic-sol mixture.

25. The teaching apparatus described in claim 24 wherein:

said mixture is approximately 20% poly-vinyl resin and approximately 80% plastic-sol.

26. The teaching apparatus described in claim 3 wherein:

said means for supporting said cavity and elongated means in a generally horizontal position comprises a flexible sheet extending underneath said cavity means and elongated member and having two oppositely disposed sides attached to opposite walls of the housing.

27. The teaching apparatus described in claim 26 wherein said flexible sheet comprises a sheet of flexible vinyl plastic of the order of .040 inch thick.

28. The teaching apparatus described in claim 3 comprising:

a flexible member extending downwardly over the openings in said housing and biased in a generally downward direction.

29. A teaching apparatus for use in instructing in the technique of artificial insemination comprising housing means having an external configuration simulating the posterior portion of an animal and having an opening formed in the anal and vulvular areas of the simulated animal, said opening being covered by a relatively thick, resilient wall section having an upper, generally circular, opening and a lower, smaller slotted opening respectively simulating the anus and vulva of a simulated animal;

means for simulating the waste tract of the simulated animal comprising a cavity having flexible interior and exterior walls, said means being located within said housing of said cavity in communication with the upper opening of said cavity in communication with the upper opening of said flexible wall section;

means for simulating the reproductive organs of the simulated animal comprising an elongated cylindrical member in communication with the lower opening of said flexible wall, said means including cervix simulating spaced discs located in said cylindrical member having skewed apertures out of alignment with one another;

means for simulating the broad ligament of the simulated animal and for supporting said simulated waste and reproductive organs in a generally horizontal position within said housing and adjacent one another for enabling the manipulation of said elongated cylindrical member through the intervening flexible walls of said cavity; and means for selectively introducing air into the inflatable wall of said waste tract simulating means for separating the respective interior and exterior walls thereof forming an air sac between the inner cavity wall and the reproductive organ simulating means.

30. An apparatus for simulating the waste tract of a bovine animal or the like comprising a cavity having flexible interior and exterior walls simulating the waste tract of an animal; and means for selectively separating at least a portion of the interior walls of said cavity from the exterior wall thereof to simulate the pressures encountered inside the rectum of a live animal.

31. An apparatus for simulating the reproductive organ of a bovine animal or the like comprising an elongated, cylindrically shaped member having a plurality of spaced discs mounted therewith, each disc having a skewed aperture therethrough.

32. An apparatus for simulating the reproductive organ of a bovine animal or the like comprising an elongated, cylindrically shaped member having a plurality of spaced discs mounted therewith, each disc including an inner portion having an overall circular shape and comprising a cluster of radially oriented bulbar masses with a skewed aperture through the center thereof.

References Cited by the Examiner

UNITED STATES PATENTS

| 88,432 | 3/1869 | Aylworth | 35—17 |
|---|---|---|---|
| 2,132,226 | 10/1938 | Wahlberg | 35—17 |
| 2,846,810 | 8/1958 | Ory | 46—123 |

EUGENE R. CAPOZIO, *Primary Examiner.*

H. S. SKOGQUIST, *Assistant Examiner.*